(12) United States Patent
Chen

(10) Patent No.: US 7,311,233 B2
(45) Date of Patent: Dec. 25, 2007

(54) BICYCLE LOCK HOLDING APPARATUS

(75) Inventor: Jennifer Chen, Changhua (TW)

(73) Assignee: Vulcan Sports Co., Ltd., Changhua (TW)

( * ) Notice: Subject to any disclaimer, the term of this patent is extended or adjusted under 35 U.S.C. 154(b) by 548 days.

(21) Appl. No.: 11/008,947

(22) Filed: Dec. 13, 2004

(65) Prior Publication Data

US 2006/0124679 A1    Jun. 15, 2006

(51) Int. Cl.
  *B62J 11/00* (2006.01)
(52) U.S. Cl. .................... 224/425; 224/935; 70/233
(58) Field of Classification Search ............... 224/412, 224/419, 420, 425, 448, 547, 935; 70/233; 24/613
  See application file for complete search history.

(56) References Cited

U.S. PATENT DOCUMENTS

| | | | | |
|---|---|---|---|---|
| 4,966,382 A * | 10/1990 | Giles | ................... | 280/288.4 |
| 5,138,901 A * | 8/1992 | Dabandjian et al. | ....... | 74/551.8 |
| 5,291,765 A * | 3/1994 | Hoisington | ................... | 70/233 |
| 5,332,183 A * | 7/1994 | Kagayama | ............. | 248/222.13 |
| 5,386,961 A * | 2/1995 | Lu | ......... | 248/223.41 |
| 5,405,113 A * | 4/1995 | Jaw | ......... | 248/229.1 |
| 5,669,536 A * | 9/1997 | Wang | ......... | 224/443 |
| 5,718,134 A * | 2/1998 | Chang | ......... | 70/233 |
| 6,095,386 A * | 8/2000 | Kuo | ......... | 224/448 |
| 6,557,808 B1 * | 5/2003 | Ling | ......... | 248/229.1 |
| 6,619,084 B2 * | 9/2003 | Kuo | ......... | 70/233 |

* cited by examiner

*Primary Examiner*—Nathan J. Newhouse
*Assistant Examiner*—Justin M. Larson
(74) *Attorney, Agent, or Firm*—Troxell Law Office, PLLC

(57) ABSTRACT

A bicycle lock holding apparatus for fastening to a bicycle frame that may be installed and removed quickly to hold a bicycle lock includes a holding structure for fastening to the bicycle frame and a coupling structure for coupling with the lock. The holding structure has an anchor seat with one end fastening to a latch dock. Through an anchor plate coupling with the anchor seat, the latch dock may be turned to change the direction of a wedge trough formed on one end thereof. The coupling structure has a latch section latching in the wedge trough with two extendable button extended from two sides to insert into apertures formed on two sides of the wedge trough so that the coupling structure and the holding structure form a firm coupling.

4 Claims, 5 Drawing Sheets

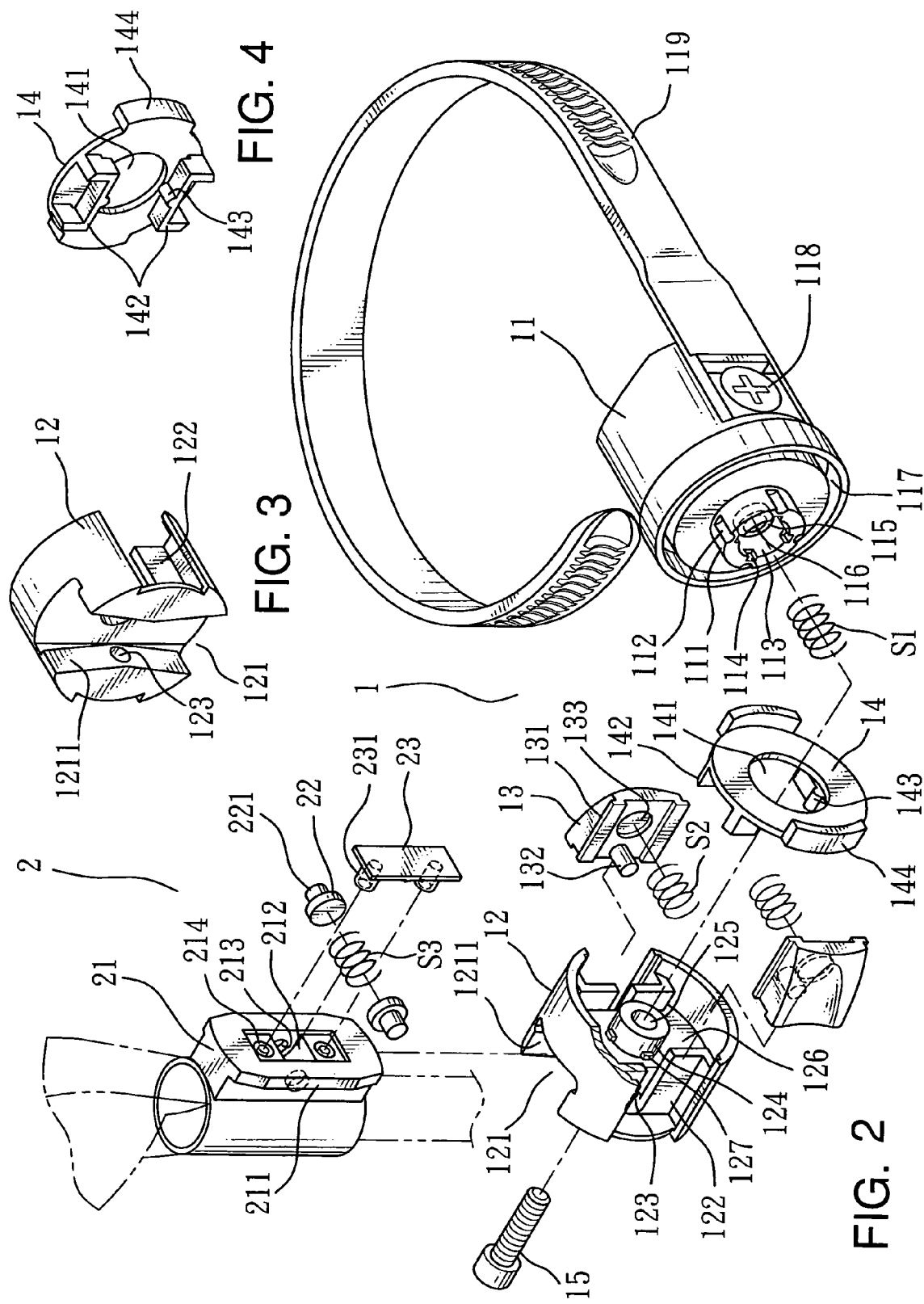

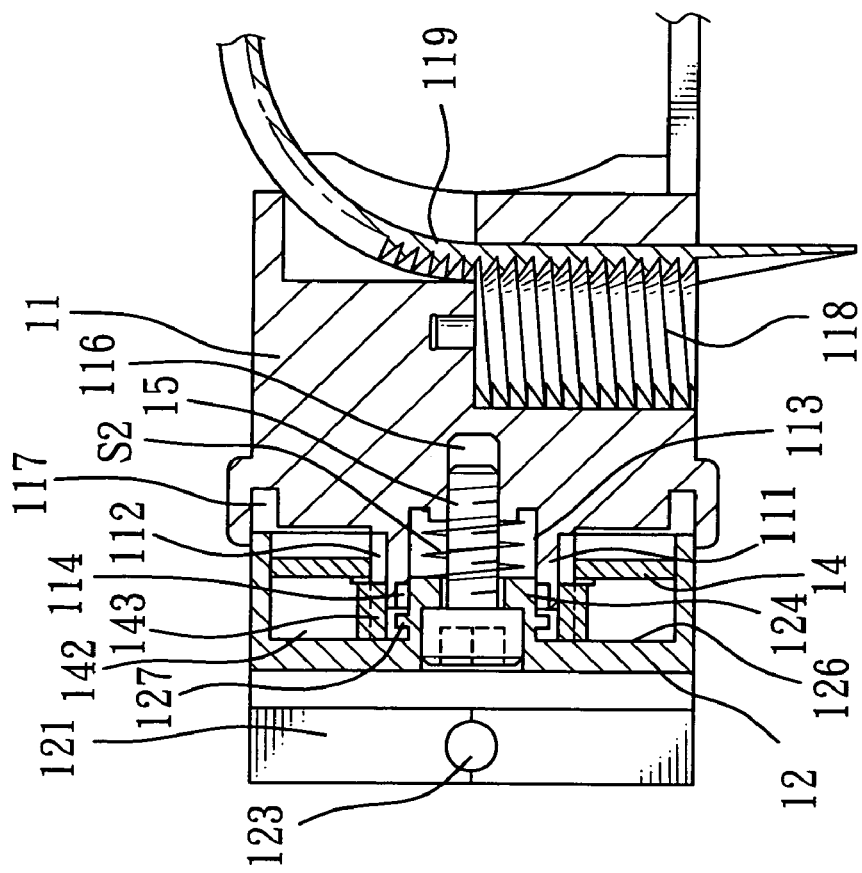
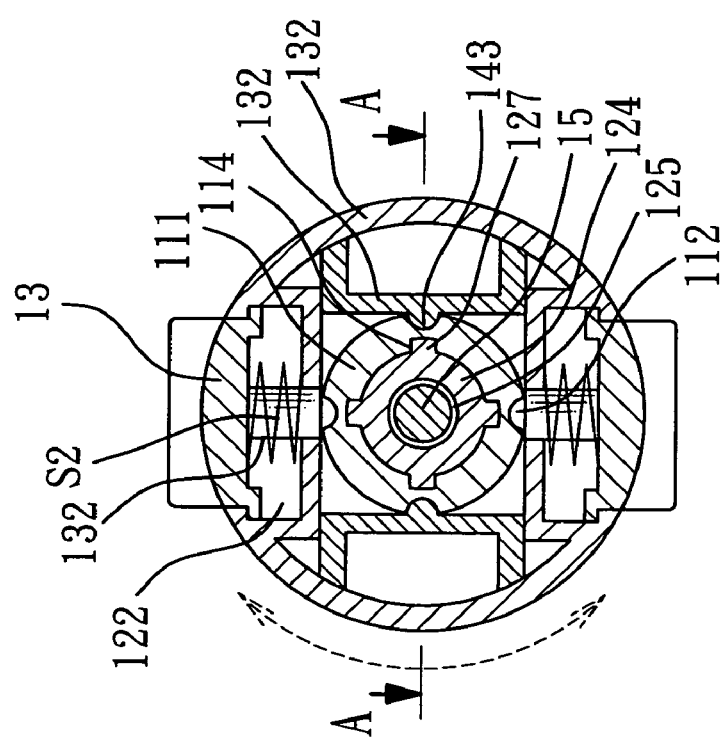
FIG. 7
FIG. 8

BICYCLE LOCK HOLDING APPARATUS

BACKGROUND OF THE INVENTION

1. Field of the Invention

The invention relates to a bicycle lock holding apparatus particularly to a holding apparatus that is fastenable to a bicycle frame and can be installed and removed quickly and change the holding direction of a lock.

2. Description of the Prior Art

The conventional holding structure for a bicycle lock such as the one disclosed in R.O.C. patent publication No. 84212630 has a coupling bolt running through the center of a holding seat to insert into a round hole formed on a coupling seat connected to a flange extended from a locking bolt. The lock is held on an anchor seat. It has only one anchor point and is not stable. When the bicycle rides on a bumpy road, the shaking and vibration tends to swing the lock or even cause the lock to bounce and drop.

SUMMARY OF THE INVENTION

Therefore the primary object of the present invention is to provide a bicycle lock holding apparatus this is more stable and can change the holding direction of the lock according to requirements. It includes a holding structure fastened to a bicycle frame and a coupling structure to couple with the lock. The holding structure includes an anchor seat, a latch dock, an anchor plate and two compression members. The coupling structure includes a latch section, two extendable buttons, a spring and a lid. The latch dock is fastened to one end of the anchor seat and has a wedge trough on one end. The latch dock may be turned to alter the direction of the wedge trough through the latched position of the anchor plate and the anchor seat. The latch section is wedged in the wedge trough with the two extendable buttons extended from two sides. The extendable buttons may be inserted into apertures formed on two sides of the wedge trough to enable the coupling structure to latch on the holding structure to form a firm coupling.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2 is an exploded view of the invention.
FIG. 3 is another perspective view of the latch dock of the invention.
FIG. 4 is another perspective view of the anchor plate of the invention.
FIG. 7 is a schematic view of the invention in an operation for turning an angle.
FIG. 8 is a cross section taken on line A-A in FIG. 7.

DESCRIPTION OF THE PREFERRED EMBODIMENT

Figure 1:
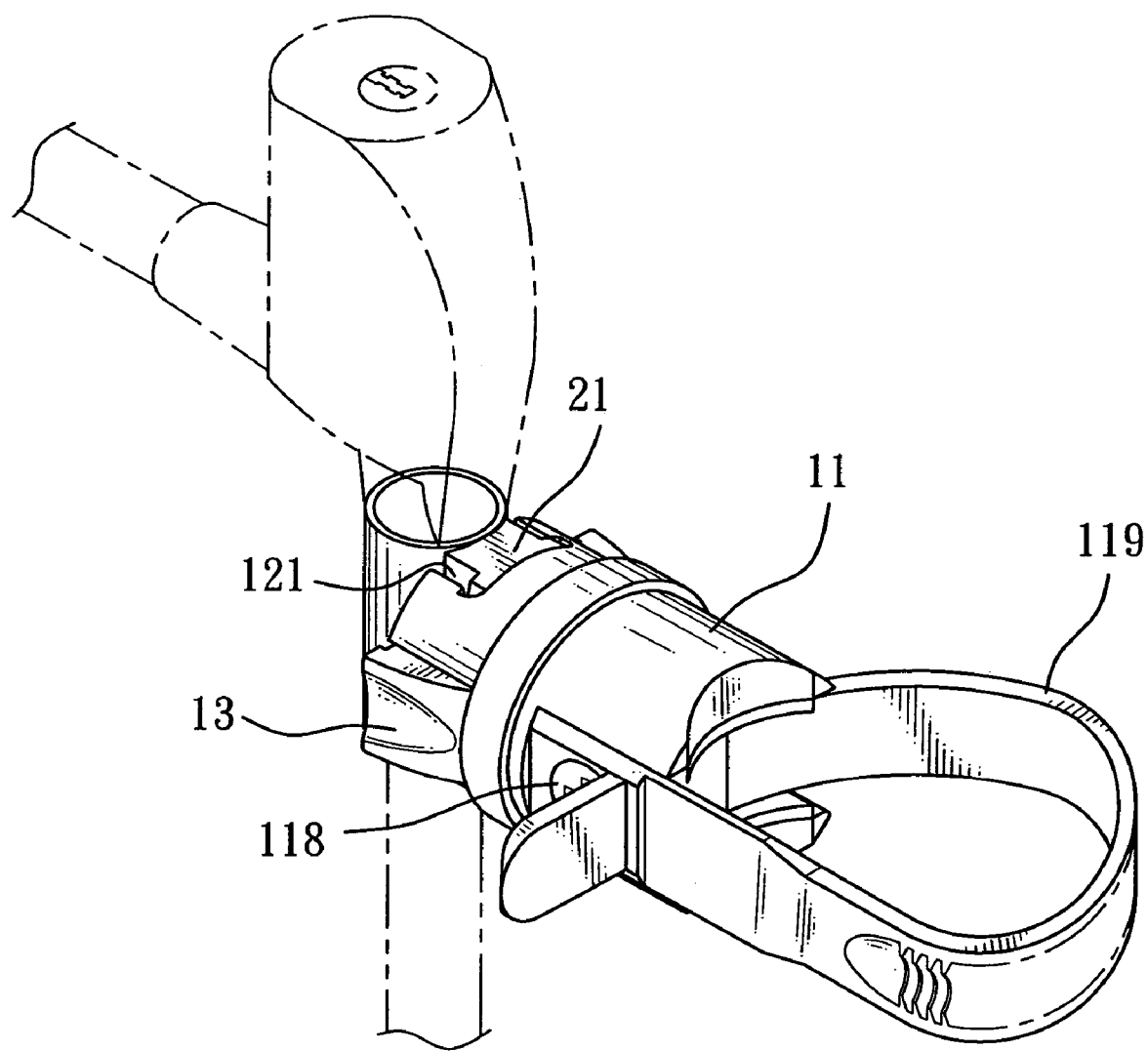
FIG. 1 is a perspective view of the invention.
Figure 5:
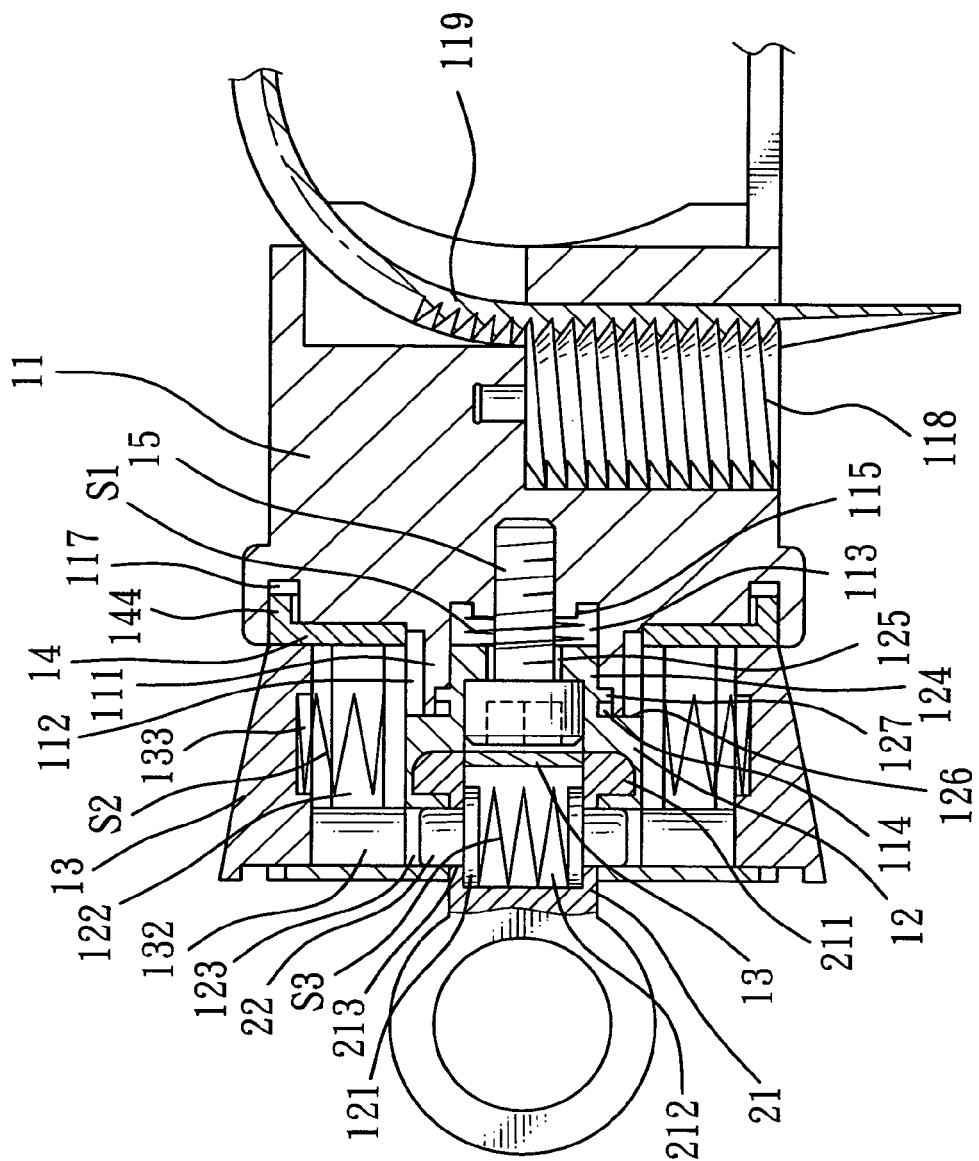
FIG. 5 is a sectional view of the invention.

Referring to FIGS. 1 through 5, the bicycle lock holding apparatus according to the invention includes a holding structure 1 and a coupling structure 2. The holding structure 1 includes:

an anchor seat 11 for fastening to a bicycle frame having a coupling portion 111 extended from one end, a groove 117 abutting the periphery, an adjustment screw 118 on one side of the periphery and a fastening strap 119 running through a body 110 of the anchor seat. By adjusting the adjustment screw 118, the fastening strap 119 may be adjusted to fasten to the bicycle frame. The coupling portion 111 has a plurality of troughs 112 on the perimeter, a round hole 113 in the center, a plurality of notches 114 on the front end of an inner wall, and a collar 115 on the bottom around the round hole 113 with a screw hole 116 formed therein. The collar 115 is coupled with a first spring S1;

a latch dock 12 fastened to one end of the anchor seat 11 having a wedge trough 121 on one end that has two sides each forming a sloped surface 1211, a latch trough 122 formed respectively on two sides having an aperture 123 leading to the wedge trough 121, a strut 124 located in the center with a through hole 125 formed thereon to be run through by a screw 15 to fasten the screw hole 116 of the anchor seat 11. There are a plurality of lugs 127 formed between the strut 124 and a retaining surface 126 to couple with the notches 114 of the anchor seat 11;

two compression members 13 wedged in the latch troughs 122 of the latch dock 12 having respectively a retaining flange 131 on a upper side and a lower side, a compression strut 132 on an inner side running through the aperture 123 of the latch dock 12 and a round hole 133 on one side of the compression strut 132 to hold a second spring S2 which has one end pressing one side of the latch trough 122; and an anchor plate 14 located in the latch dock 12 having a center opening 141 in the center, two ⊓-shape compression flanges 142 on a upper side and a lower side of one surface that have respectively a ridge 143 on an inner side facing each other to engage with the troughs 112 of the anchor seat 11, and a retaining plate 144 on each of two sides.

The coupling structure 2 is coupled on one end of a lock including a latch section 21 which has two guiding edges 211 to wedge in the wedge trough 121 of the latch dock 12, a housing chamber 212 which has an second aperture 213 on each of two sides mating the aperture 123 of the latch dock 12. The housing chamber 212 houses two extendable buttons 22 each has a button head 221 to hold a third spring S3 therebetween. Because of the elastic force of the third spring S3, the extendable buttons 22 are extended outside the apertures 213 with the button head 221 pressing an inner wall surface of the housing chamber 212. The housing chamber 212 has two anchor holes 214 formed on an upper side and a lower side to couple with anchor struts 231 located on a lid 23.

Figure 6:
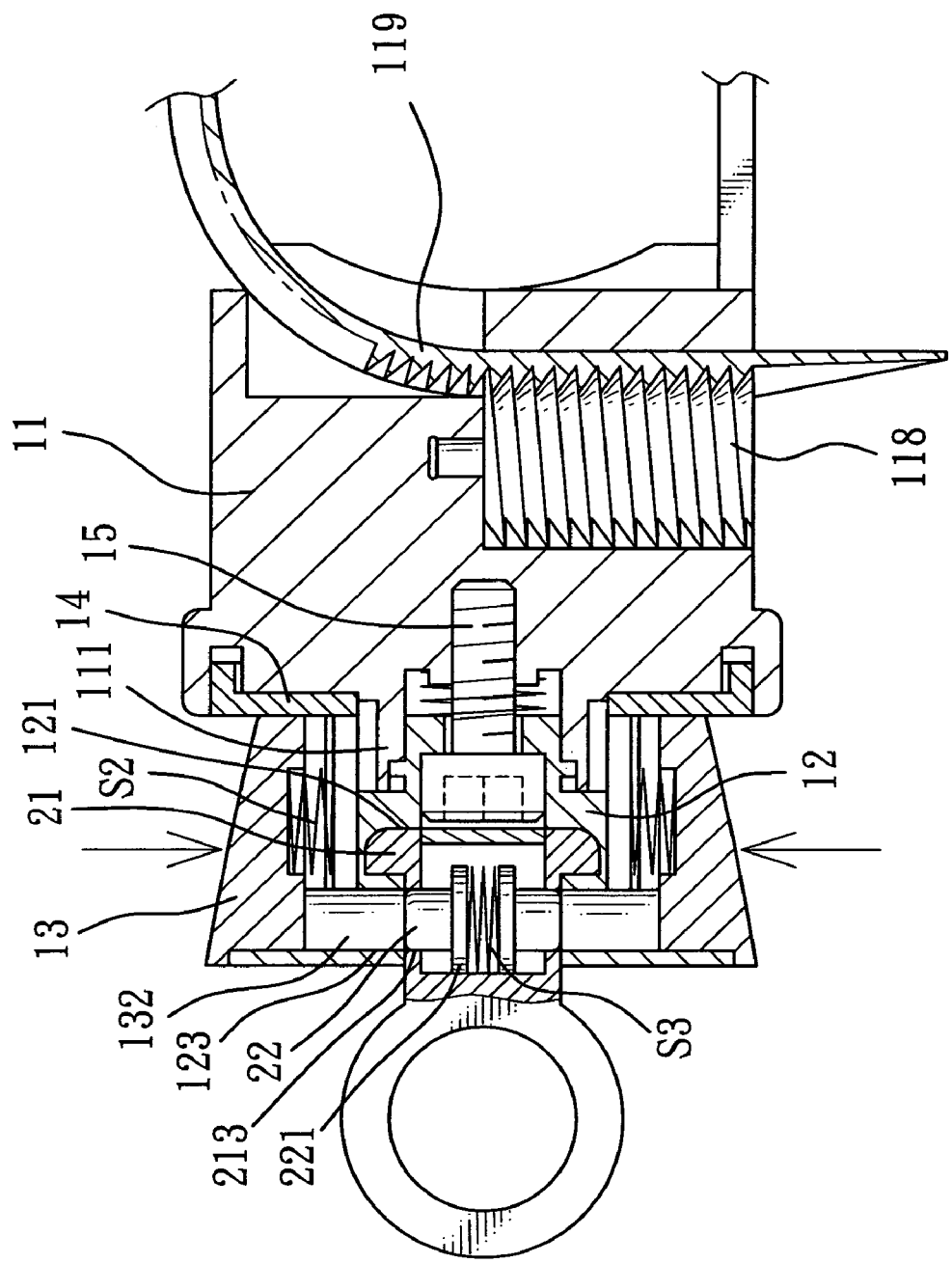
FIG. 6 is a schematic view of the invention in an operating condition.

By means of the construction set forth above, when to install the coupling structure 2 on the holding structure 1, the latch section 21 is slid in the wedge trough 121 along the sloped surfaces 1211 of the latch dock 12. The extendable buttons 22 are pushed by the sloped surfaces 1211 and retracted into the second aperture 213, and the third spring S3 is compressed. When the second aperture 213 is aligned with the aperture 123 of the latch dock 12, the extendable buttons 22 are pushed by the third spring S3 due to the returning elastic force and extended outside the apertures 213 and latch in the aperture 123 so that the latch section 21 is latched on the latch dock 12 through the latch points on two sides (referring to FIG. 6) to form a firm coupling. Therefore the lock may be fastened securely to the bicycle frame through the latch point on another side even when one side is under shaking of external forces.

Refer to FIGS. 7 and 8 for the invention to adjust the holding angle of the lock to meet user's requirement. Namely the direction of the wedge trough 121 of the latch dock 12 is altered. To achieve this purpose, first unfasten the screw 15 that fastens the latch dock 12 to the anchor seat 11. The latch dock 12 is pushed by the returning elastic force of the first spring S1 so that the lugs 127 of the latch dock 12 originally latched on the notches 114 of the anchor seat 11 escape. Then turn the latch dock 12 to move the ridges 143 of the anchor plate 14 to escape the upper and lower troughs 112 of the coupling portion 111 and latch in the troughs 112 on the left side and the right side. Then fasten the screw 15 again. The coupling structure 2 is wedged in the holding structure 1 horizontally and the angle for holding the lock is changed.

I claim:

1. A bicycle lock holding apparatus comprising a holding structure and a coupling structure, wherein the holding structure includes:

an anchor seat for fastening to a bicycle frame, the anchor seat having a coupling portion extended from one end and a groove abutting its periphery, the coupling portion having a plurality of troughs on its perimeter, a round hole in its center, a plurality of notches on a front end of an inner wall, a collar on its bottom surrounding the round hole which has a screw hole formed therein, the collar being coupled with a first spring;

a latch dock fastened to the one end of the anchor seat, the latch dock having a wedge trough on one end thereof, two latch troughs on two lateral sides thereof wherein each latch trough has a respective aperture leading to the wedge trough, a strut in its center that has a central through hole to receive a screw for fastening the screw hole of the anchor seat, a plurality of lugs between the strut and a retaining surface to couple with the notches of the anchor seat;

two compression members latched in the latch troughs of the latch dock having two retaining flanges on an upper side and a lower side, a compression strut on an inner side to run through the aperture of the latch dock, and a round hole on one side of the compression strut to couple with a second spring; and an anchor plate located in the latch dock, the anchor plate having a central opening, two compression flanges on an upper side and a lower side of one surface that have respectively a ridge on an inner side facing each other to wedge in the troughs of the anchor seat, and two retaining plates on two sides of the periphery;

wherein the coupling structure includes a latch section which has two guiding edges to wedge in the wedge trough of the latch dock and a housing chamber to hold two extendable buttons, the housing chamber having second apertuers that mate with the respective apertures of the latch dock, the two extendable buttons having a button head to couple with a third spring therebetween such that the extendable buttons are extended outside the second apertures, the button head pressing an inner wall surface of the housing chamber, the housing chamber having two anchor holes on a upper side and a lower side to couple with anchor struts of a lid.

2. The bicycle lock holding apparatus of claim 1, wherein the anchor seat is fastened to an adjustment screw and a fastening strap on one side of its periphery.

3. The bicycle lock holding apparatus of claim 1, wherein the wedge trough of the latch dock has two sides formed with sloped surfaces.

4. The bicycle lock holding apparatus of claim 1, wherein the coupling structure is fastened to one end of a lock.

* * * * *